(12) United States Patent
Lee

(10) Patent No.: US 10,550,756 B1
(45) Date of Patent: Feb. 4, 2020

(54) COOLANT CONTROL VALVE, COOLING SYSTEM PROVIDED WITH THE SAME AND CONTROL METHOD THEREOF

(71) Applicants: Hyundai Motor Company, Seoul (KR); KIA Motors Corporation, Seoul (KR)

(72) Inventor: Hyo Jo Lee, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/192,049

(22) Filed: Nov. 15, 2018

(30) Foreign Application Priority Data

Aug. 10, 2018 (KR) .......................... 10-2018-0093781

(51) Int. Cl.
| | | |
|---|---|---|
| *F01P 7/14* | (2006.01) | |
| *F16K 31/44* | (2006.01) | |
| *F01P 7/16* | (2006.01) | |
| *F16K 31/524* | (2006.01) | |
| *F16K 31/04* | (2006.01) | |

(52) U.S. Cl.
CPC ................ *F01P 7/16* (2013.01); *F16K 31/04* (2013.01); *F16K 31/524* (2013.01); *F01P 2007/146* (2013.01)

(58) Field of Classification Search
CPC .......... F01P 2007/146; F01P 3/02; F01P 7/14; F16K 31/52416; F16K 11/165; F16K 31/04; F16K 11/10; F16K 27/0263; F16K 31/524
See application file for complete search history.

(56) References Cited

U.S. PATENT DOCUMENTS

| | | | | |
|---|---|---|---|---|
| 4,469,133 A | * | 9/1984 | Boesing | B60H 1/00485 137/625.29 |
| 8,701,603 B2 | * | 4/2014 | Warnery | F01P 7/167 123/41.08 |
| 2016/0003125 A1 | * | 1/2016 | Lee | F16K 11/076 123/41.08 |
| 2016/0010535 A1 | * | 1/2016 | Lee | F16K 11/0876 137/340 |

* cited by examiner

*Primary Examiner* — Long T Tran
(74) *Attorney, Agent, or Firm* — Brinks Gilson & Lione

(57) ABSTRACT

A coolant control system for a motor vehicle includes a controller determining whether the output signal of the vehicle satisfies a predetermined driving condition and controlling a coolant control valve including a driving motor. The coolant control valve includes a coolant inflow chamber, a first coolant line, a second coolant line and a third coolant line formed in a valve housing. The coolant control valve further includes a first outer valve, a first inner valve and a second other valve formed in the valve housing, and each of the valves is communicating with each of the coolant lines, selectively and respectively. In addition, each of the valves includes a hole for selectively communicating with a coolant inflow chamber.

22 Claims, 14 Drawing Sheets

Cylinder head

COOLANT CONTROL VALVE, COOLING SYSTEM PROVIDED WITH THE SAME AND CONTROL METHOD THEREOF

CROSS-REFERENCE TO RELATED APPLICATION

This application claims priority to and the benefit of Korean Patent Application No. 10-2018-0093781, filed on Aug. 10, 2018, which is incorporated herein by reference in its entirety.

FIELD

The present disclosure relates to a coolant control valve in a cooling system for a motor vehicle and a control method thereof.

BACKGROUND

The statements in this section merely provide background information related to the present disclosure and may not constitute prior art.

An engine discharges thermal energy while generating torque based on combustion of fuel, and a coolant absorbs thermal energy while circulating through the engine, a heater and a radiator, and releases the thermal energy to the outside.

When a temperature of the coolant of the engine is low, viscosity of oil may increase frictional force and fuel consumption, and a temperature of an exhaust gas may increase gradually to lengthen a time for a catalyst to be activated, which degrades quality of the exhaust gas. In addition, as a time taken for a function of the heater to be normalized is increased, a driver of the vehicle may feel discomfort.

When the coolant temperature is excessively high, we have discovered that knocking is occurred and performance of the engine may deteriorate by adjusting ignition timing in order to suppress the knocking. In addition, when a temperature of a lubricant is excessively high, a viscosity of the lubricant is lowered and the lubrication performance may be deteriorated.

A water pump of the engine includes a mechanical water pump driven in proportion to the number of revolutions of the engine and a variable water pump capable of being controlled according to the engine and environmental factors regardless of the number of revolutions of the engine. The variable water pump may control the flow rate to improve warm-up performance, fuel efficiency, heating and cooling performance. Among the variable water pumps, the multistage control water pump may control the flow rate from 0% to 100% at the water pump speed proportional to the engine speed.

However, we have discovered that even if the flow rate of the coolant is controlled by the mechanical or variable water pump, the cooling system must be equipped with a mechanical or electronic thermostat and the coolant may flow through a radiator.

The above information disclosed in this Background section is only for enhancement of understanding of the background of the present disclosure, and therefore it may contain information that does not form the prior art that is already known to a person of ordinary skill in the art.

SUMMARY

The present disclosure provides a coolant control valve, a cooling system including the same, and a control method thereof having advantages of reducing the total volume for securing a space margin, controlling the coolant according to the driving conditions, reducing warm-up time of an engine and reducing number of temperature sensors.

A coolant control valve according to various exemplary forms of the present disclosure may include a valve housing of which a coolant inflow chamber, a first coolant line, a second coolant line and a third coolant line are formed therein, a first outer valve of which a first outer tip is protruded, a first outer hole communicated with the second coolant line is formed thereto, and the first outer valve is movably disposed in the valve housing for blocking the second coolant line and for selectively communicating the first coolant line with the coolant inflow chamber. A first inner valve of which a first inner tip is protruded, a first inner hole communicated with the coolant inflow chamber and selectively communicated with the first outer hole is formed thereto, and the first inner valve is movably disposed in the first outer valve. A second outer valve of which a second outer tip is protruded and the second outer valve is movably disposed in the valve housing for selectively communicating the third coolant line with the coolant inflow chamber. A cam includes a first track for contacting the first outer tip and selectively pushing the first outer valve, a second track for contacting the first inner tip and selectively pushing the first inner valve and a third track for contacting the second outer tip and selectively pushing the second outer valve. A drive motor is configured for selectively rotating the cam and a controller is configured for controlling an operation of the drive motor.

The coolant control valve may further include a cam spring for elastically supporting the cam.

The coolant control valve may further include a first outer valve spring for elastically supporting the first outer valve, a first inner valve spring for elastically supporting the first inner valve and a second outer valve spring for elastically supporting the second outer valve.

The coolant control valve may further include a first outer sealing attached to the first outer valve for inhibiting leakage of coolant between the first coolant line and the coolant inflow chamber, a second outer sealing attached to the first outer valve for inhibiting leakage of coolant between the first coolant line and the second coolant line and a third outer sealing attached to the second outer valve for inhibiting leakage of coolant between the third coolant line and the coolant inflow chamber.

A first blocking plate may be disposed between the coolant inflow chamber and the first coolant line, a second blocking plate may be disposed between the first coolant line and the second coolant line, a first guide wall may be formed to an end of the second blocking plate, the first outer sealing may be configured to selectively contact the first blocking plate and the second outer sealing may be configured to contact the first guide wall.

An oil cooler line for supplying coolant to an oil cooler may be formed to the valve housing.

According to a further form of the present disclosure, the coolant control valve may further include a fourth coolant line formed to the valve housing, a second outer hole formed to the second outer valve and configured for communicating with the fourth coolant line, and a second inner valve including a second inner tip protruded and a second inner hole configured for communicating with the coolant inflow chamber and selectively communicating with the second outer hole, and the second inner valve movably disposed in the second outer valve. The cam is further includes a fourth track for contacting the second inner tip and selectively pushing the second inner valve.

The coolant control valve may further include a first outer valve spring for elastically supporting the first outer valve, a first inner valve spring for elastically supporting the first inner valve, a second outer valve spring for elastically supporting the second outer valve and a second inner valve spring for elastically supporting the second inner valve.

The coolant control valve may further include a first outer sealing attached to the first outer valve for inhibiting leakage of coolant between the first coolant line and the coolant inflow chamber, a second outer sealing attached to the first outer valve for inhibiting leakage of coolant between the first coolant line and the second coolant line, a third outer sealing attached to the second outer valve for inhibiting leakage of coolant between the third coolant line and the coolant inflow chamber and a fourth outer sealing attached to the second outer valve for inhibiting leakage of coolant between the fourth coolant line and the third coolant line.

A first blocking plate may be disposed between the coolant inflow chamber and the first coolant line, a second blocking plate may be disposed between the first coolant line and the second coolant line, a first guide wall may be formed to an end of the second blocking plate, the first outer sealing may be configured to selectively contact the first blocking plate, the second outer sealing may be configured to contact the first guide wall, a third blocking plate may be disposed between the coolant inflow chamber and the third coolant line, a fourth blocking plate may be disposed between the third coolant line and the fourth coolant line, a second guide wall may be formed to an end of the fourth blocking plate, the third outer sealing may be configured to selectively contact the third blocking plate and the fourth outer sealing may be configured to contact the second guide wall.

A cooling system according to various exemplary forms of the present disclosure may include a water pump, an engine receiving coolant from the water pump and including an engine block and a cylinder head, a valve housing of which a coolant inflow chamber communicated with the cylinder head, a first coolant line communicated with the engine block, a second coolant line communicated with at least one of heat exchange elements and a third coolant line communicated with a radiator are formed therein. The cooling system further includes a first outer valve of which a first outer tip is protruded, a first outer hole communicated with the second coolant line is formed thereto, and the first outer valve movably disposed in the valve housing for blocking the second coolant line and for selectively communicating the first coolant line with the coolant inflow chamber. A first inner valve of which a first inner tip is protruded, a first inner hole communicated with the coolant inflow chamber and selectively communicated with the first outer hole is formed thereto, and the first inner valve movably disposed in the first outer valve, a second outer valve of which a second outer tip is protruded and the second outer valve movably disposed in the valve housing for selectively communicating the third coolant line with the coolant inflow chamber. A cam includes a first track for contacting the first outer tip and selectively pushing the first outer valve, a second track for contacting the first inner tip and selectively pushing the first inner valve and a third track for contacting the second outer tip and selectively pushing the second outer valve. A drive motor is configured for selectively rotating the cam. The cooling system further includes a first coolant temperature sensor for measuring a first temperature of coolant passing through the cylinder head and outputting a first corresponding signal, a second coolant temperature sensor for measuring a second temperature of coolant passing through the engine block and outputting a second corresponding signal and a controller for controlling operation of the drive motor according to output signals of a vehicle operation state detecting portion including the first and the second coolant temperature sensors.

The cooling system may further include a first outer sealing attached to the first outer valve for inhibiting leakage of coolant between the first coolant line and the coolant inflow chamber, a second outer sealing attached to the first outer valve for inhibiting leakage of coolant between the first coolant line and the second coolant line and a third outer sealing attached to the second outer valve for inhibiting leakage of coolant between the third coolant line and the coolant inflow chamber.

A first blocking plate may be disposed between the coolant inflow chamber and the first coolant line, a second blocking plate may be disposed between the first coolant line and the second coolant line, a first guide wall may be formed to an end of the second blocking plate, the first outer sealing may be configured to selectively contact the first blocking plate and the second outer sealing may be configured to contact the first guide wall.

The cooling system may further include a fourth coolant line formed to the valve housing, and a second outer hole formed to the second outer valve and communicated with the fourth coolant line, and a second inner valve including a second inner tip protruded and a second inner hole configured for communicating with the coolant inflow chamber and selectively communicating with the second outer hole, and the second inner valve is movably disposed in the second outer valve, and the cam further includes a fourth track for contacting the second inner tip and selectively pushing the second inner valve.

The cooling system may further include a first outer sealing attached to the first outer valve for inhibiting leakage of coolant between the first coolant line and the coolant inflow chamber, a second outer sealing attached to the first outer valve for inhibiting leakage of coolant between the first coolant line and the second coolant line, a third outer sealing attached to the second outer valve for inhibiting leakage of coolant between the third coolant line and the coolant inflow chamber and a fourth outer sealing attached to the second outer valve for inhibiting leakage of coolant between the fourth coolant line and the third coolant line.

A first blocking plate may be disposed between the coolant inflow chamber and the first coolant line, a second blocking plate may be disposed between the first coolant line and the second coolant line, a first guide wall may be formed to an end of the second blocking plate, the first outer sealing may be configured to selectively contact the first blocking plate, the second outer sealing may be configured to contact the first guide wall, a third blocking plate may be disposed between the coolant inflow chamber and the third coolant line, a fourth blocking plate may be disposed between the third coolant line and the fourth coolant line, a second guide wall may be formed to an end of the fourth blocking plate, the third outer sealing may be configured to selectively contact the third blocking plate and the fourth outer sealing may be configured to contact the second guide wall.

An oil cooler line for supplying coolant to an oil cooler may be formed to the valve housing.

The cooling system may be applied to control method according to various exemplary forms of the present disclosure. The controller may determine whether the output signal of the vehicle operation state detecting portion satisfies a predetermined cold driving condition and the controller may control the drive motor such that the first, second, and third coolant lines are blocked if the cold driving condition is satisfied.

The controller may determine whether the output signal of the vehicle operation state detecting portion satisfies a predetermined warm driving condition and the controller may control the drive motor such that the second coolant line is opened if the warm driving condition is satisfied.

The controller may determine whether the output signal of the vehicle operation state detecting portion satisfies a predetermined high temperature driving condition and the controller may control the drive motor such that the second and third coolant lines are opened if the high temperature driving condition is satisfied.

The controller may determine whether the output signal of the vehicle operation state detecting portion satisfies a predetermined extreme high temperature driving condition and the controller may control the drive motor such that the first, second and third coolant lines are opened if the extreme high temperature driving condition is satisfied.

The controller may determine whether the output signal of the vehicle operation state detecting portion satisfies a predetermined cold driving condition and the controller may control the drive motor such that the first, second, third, and fourth coolant lines are blocked if the cold driving condition is satisfied, the controller may determine whether the output signal of the vehicle operation state detecting portion satisfies a predetermined warm driving condition and the controller may control the drive motor such that the second coolant line or the fourth coolant line is opened if the warm driving condition is satisfied, the controller may determine whether the output signal of the vehicle operation state detecting portion satisfies a predetermined high temperature driving condition and the controller may control the drive motor such that the second, third and fourth coolant lines are opened if the high temperature driving condition is satisfied and the controller may determine whether the output signal of the vehicle operation state detecting portion satisfies a predetermined extreme high temperature driving condition and the controller may control the drive motor such that the first, second, third and fourth coolant lines are opened if the extreme high temperature driving condition is satisfied.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
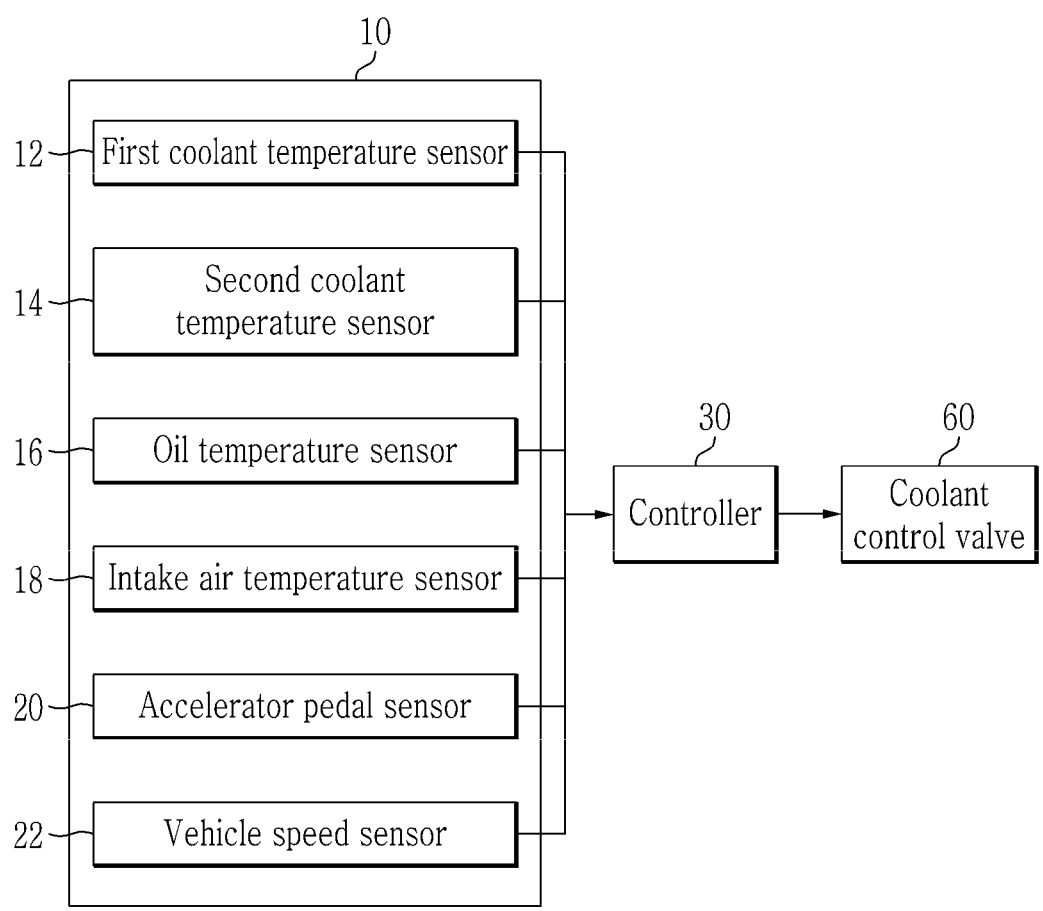
FIG. 1 is a block diagram of a control system according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second, and the like is to divide the names because the names of the components are the same, and an order thereof is not particularly limited.

Figure 2:
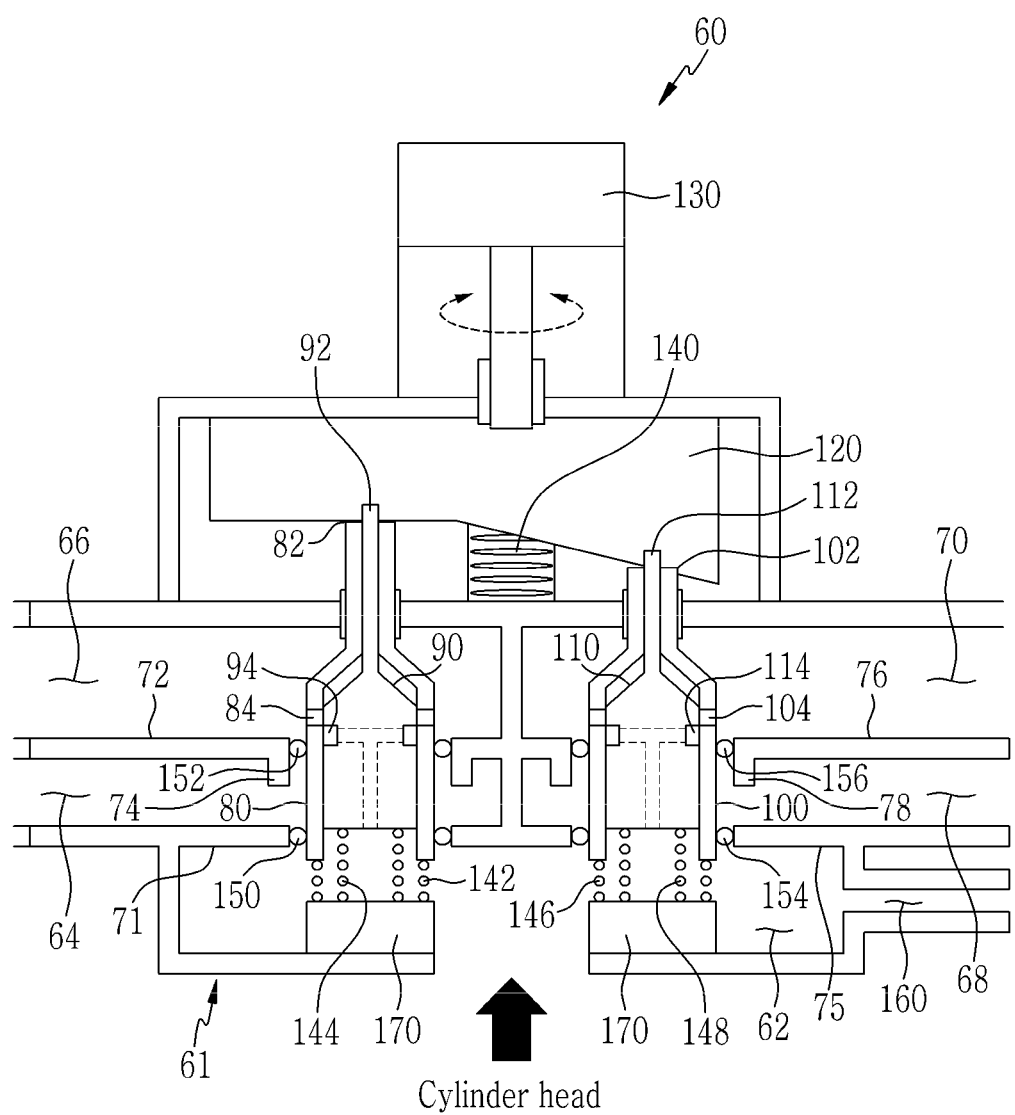
FIG. 2 is a cross-sectional view of a coolant control valve according to the exemplary form of the present disclosure.

FIG. 1 is a block diagram of a control system according to an exemplary form of the present disclosure and FIG. 2 is a cross-sectional view of a coolant control valve according to the exemplary form of the present disclosure.

Figure 3:
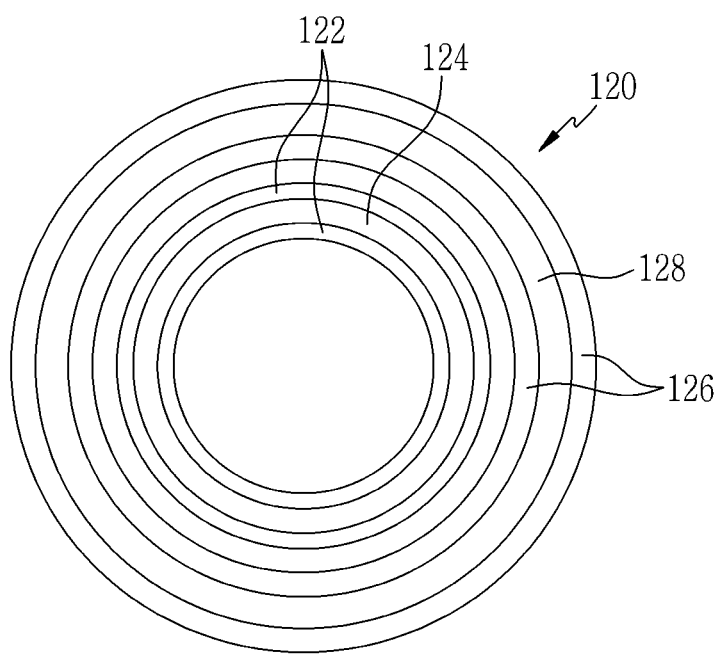
FIG. 3 is a bottom view of a cam of the coolant control valve according to the exemplary form of the present disclosure.
Figure 4:
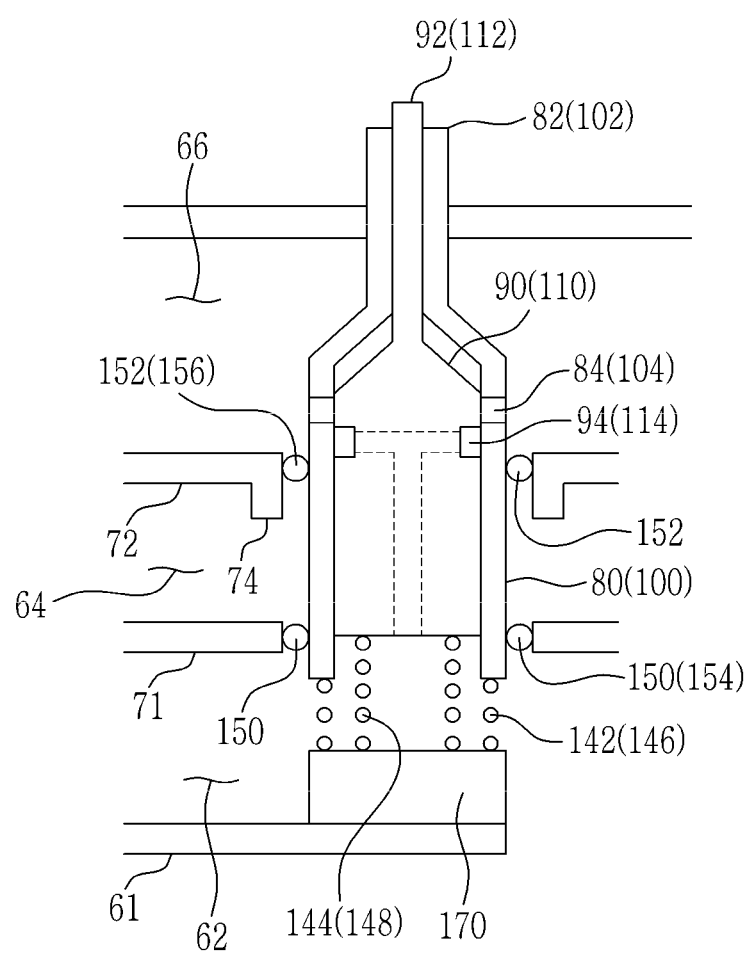
FIG. 4 through FIG. 7 are cross-sectional views showing operations of the coolant control valve according to the exemplary form of the present disclosure.

FIG. 3 is a bottom view of a cam of the coolant control valve according to the exemplary form of the present disclosure and FIG. 4 is a cross-sectional view showing an operation of the coolant control valve according to the exemplary form of the present disclosure.

Figure 9:
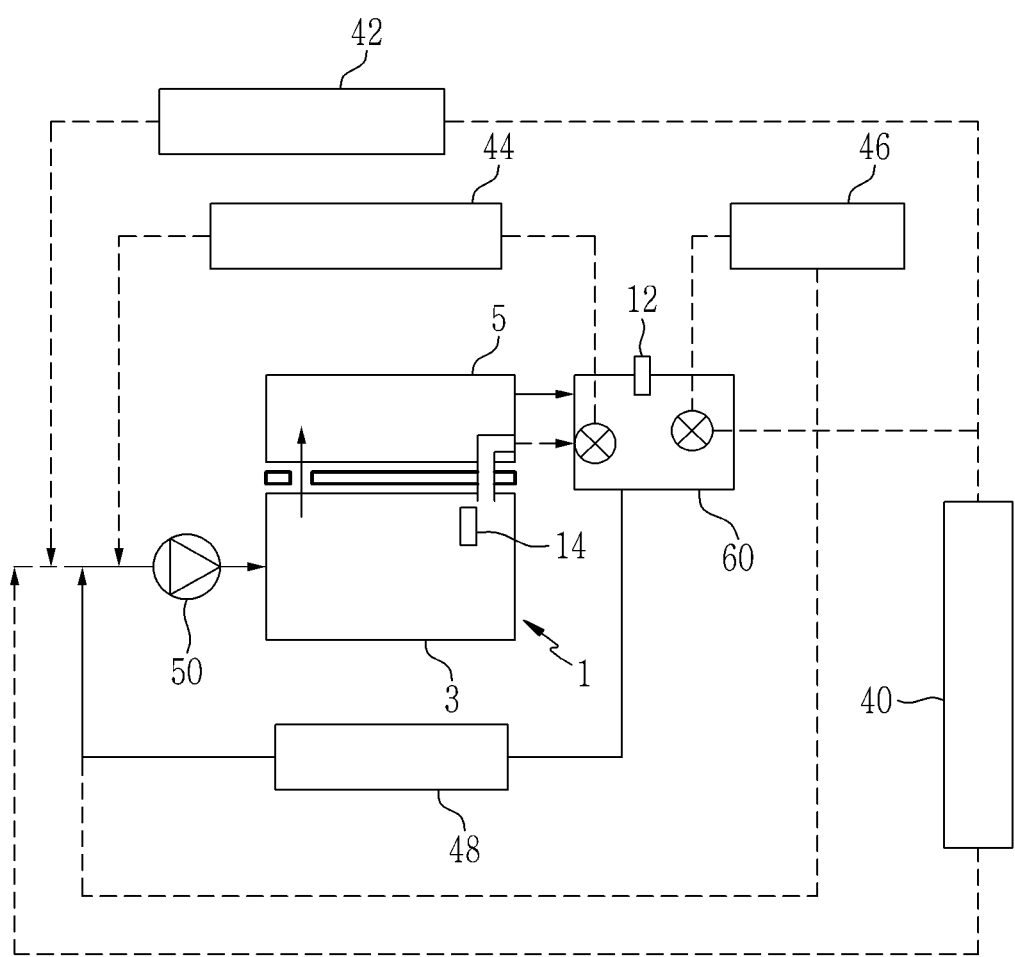
FIG. 9 through FIG. 12 are schematic diagrams showing operations of the cooling system according to the exemplary form of the present disclosure.

FIG. 9 is a schematic diagram showing an operation of a cooling system according to the exemplary form of the present disclosure.

Referring to FIGS. 1 through 4 and FIG. 9, a cooling system according to a form of the present disclosure includes a controller 30 for controlling the operation of a coolant control valve 60 according to an output signal of a vehicle operation state detecting portion 10.

The vehicle operation state detecting portion 10 includes a first coolant temperature sensor 12, a second coolant temperature sensor 14, an oil temperature sensor 16 for detecting engine oil temperature and outputting a corresponding signal, an intake air temperature sensor 18 for detecting intake air temperature and outputting a corresponding signal, an accelerator pedal sensor 20 for detecting an operation angle of an accelerator pedal and outputting a corresponding signal and a vehicle speed sensor 22 for detecting a speed of a vehicle and outputting a corresponding signal.

The controller 30 may be implemented as one or more microprocessors operating by a predetermined program, and the predetermined program may include a series of commands for performing the exemplary form of the present disclosure. The controller 30 may control the operation of the coolant control valve 60 in a plurality of operation modes set in advance based on the operation state information of the vehicle transmitted from the vehicle operation state detecting portion 10.

As shown in FIG. 9, coolant is supplied from a water pump 50 to an engine 1 including an engine block 3 and a cylinder head 5, and the coolant is supplied to a radiator 40 and a plurality of heat exchanging elements. The plurality of heat exchange elements include, for example, an exhausted gas recirculation (EGR) cooler 44, a heater 46 and an oil cooler 48. The EGR cooler 44 may include an HP-EGR cooler and an LP-EGR cooler. However, for ease of understanding, the EGR cooler 44 will be described. A reservoir tank 42 is disposed for receiving part of the coolant supplied to the radiator 40 to remove bubbles and the like.

As shown in FIG. 9, the first coolant temperature sensor 12 is installed to measure a first temperature of the coolant passing through the cylinder head 5 and output a first corresponding signal, and may be mounted on the coolant control valve 60. The second coolant temperature sensor 14 is mounted to measure a second temperature of the coolant passing through the engine block 3 and output a second corresponding signal, and may be mounted on the engine block 3.

As shown in FIG. 2, the coolant control valve 60 according to the form of the present disclosure includes a valve housing 61, a first outer valve 80, a first inner valve 90, a second outer valve 100, a second inner valve 110, and the controller 30 controls the operation of the driving motor 130 in accordance with an output signal of the vehicle operation state detecting portion 10.

As shown in FIGS. 2 and 9, in the valve housing 61, a coolant inflow chamber 62 communicating with the cylinder head 5, a first coolant line 64 communicating with the engine block 3, a second coolant line 66 communicating with at least one of the heat exchanging elements, a third coolant line 68 communicating with the radiator 40 and a fourth coolant line 70 communicating with at least one of the other heat exchanging element are formed. For example, the second coolant line 66 may communicate with the EGR cooler 44 and the fourth coolant line 70 may communicate with the heater 46, but the present disclosure is not limited thereto.

A first outer tip 82 is protruded on the first outer valve 80 and a first outer hole 84 communicating with the second coolant line 66 is formed to the first outer valve 80. In addition, the first outer valve 80 is movably disposed in the valve housing 61 for blocking the second coolant line 66 and for selectively communicating the first coolant line 64 with the coolant inflow chamber 62. A first inner tip 92 is protruded on the first inner valve 90 and a first inner hole 94 communicated with the coolant inflow chamber 62 is formed to the first inner valve 90. Furthermore, the first inner valve 90 is movably disposed in the first outer valve 80. The first inner tip 92 may protrude more than the first outer tip 82.

As shown in FIG. 2, a second outer tip 102 is protruded on the second outer valve 100 and a second outer hole 104 communicating with the fourth coolant line 70 is formed to the second outer valve 100. In addition, the second outer valve 100 is movably disposed in the valve housing 61 for blocking the fourth coolant line 70 and for selectively communicating the third coolant line 68 with the coolant inflow chamber 62. A second inner tip 112 is protruded on the second inner valve 110 and a second inner hole 114 communicated with the coolant inflow chamber 62 is formed to the second inner valve 110. Furthermore, the second inner valve 110 is movably disposed in the second outer valve 100. The second inner tip 112 may protrude more than the second outer tip 102.

Referring to FIGS. 2 and 3, a first track 122 contacting the first outer tip 82 and selectively pushing the first outer valve 80, a second track 124 contacting the first inner tip 92 and selectively pushing the first inner valve 90, a third track 126 contacting the second outer tip 102 and selectively pushing the second outer valve 100 and a fourth track 128 contacting the second inner tip 112 and selectively pushing the second inner valve 110 are formed to the cam 120. The second track 124 may be formed in the first track 122 and the fourth track 128 may be formed in the third track 126.

As shown in FIG. 2, the driving motor 130 rotates the cam 120 and the controller 30 controls the operation of the driving motor 130. A cam spring 140 is mounted on the valve housing 61 to elastically support the cam 120.

A first outer valve spring 142 is mounted to elastically support the first outer valve 80 and a first inner valve spring 144 is mounted to elastically support the first inner valve 90. A second outer valve spring 146 is mounted to elastically support the second outer valve 100 and a second inner valve spring 148 is mounted to elastically support the second inner valve 110. A spring plate 170 may be provided in the valve housing 61 for supporting the first outer valve spring 142, the first inner valve spring 144, the second outer valve spring 146 and the second inner valve spring 148.

As shown in FIG. 2, the coolant control valve 60 includes a first outer sealing 150 attached to the first outer valve 80 for inhibiting leakage of coolant between the first coolant line 64 and the coolant inflow chamber 62, a second outer sealing 152 attached to the first outer valve 80 for inhibiting leakage of coolant between the first coolant line 64 and the second coolant line 66, a third outer sealing 154 attached to the second outer valve 100 for inhibiting leakage of coolant between the third coolant line 68 and the coolant inflow chamber 62 and a fourth outer sealing 156 attached to the second outer valve 100 for inhibiting leakage of coolant between the fourth coolant line 70 and the third coolant line 68. For example, each of the outer sealings 150, 152, 154, and 156 may be formed as an O-ring and configured for inhibiting the outflow of coolant and preventing leakage of coolant respectively between the first coolant line 64 and the coolant inflow chamber 62, between the first coolant line 64 and the second coolant line 66, between the third coolant line 68 and the coolant inflow chamber 62, and between the fourth coolant line 70 and the third coolant line 68.

A first blocking plate 71 is disposed between the coolant inflow chamber 62 and the first coolant line 64, a second blocking plate 72 is disposed between the first coolant line 64 and the second coolant line 66, a first guide wall 74 is formed to an end of the second blocking plate 72, the first outer sealing 150 selectively contacts the first blocking plate 71 and the second outer sealing 152 contacts the first guide wall 74. The first guide wall 74 is formed along moving direction of the first outer valve 80. And thus the second outer sealing 152 maintains contact with the first guide wall 74 despite the movement of the first outer valve 80.

A third blocking plate 75 is disposed between the coolant inflow chamber 62 and the third coolant line 68, a fourth blocking plate 76 is disposed between the third coolant line 68 and the fourth coolant line 70, a second guide wall 78 is formed to an end of the fourth blocking plate 76, the third outer sealing 154 selectively contacts the third blocking plate 75 and the fourth outer sealing 156 contacts the second guide wall 78. The second guide wall 78 is formed along moving direction of the second outer valve 100. And thus the fourth outer sealing 156 maintains contact with the second guide wall 78 despite the movement of the second outer valve 100.

As shown in FIGS. 2 and 9, an oil cooler line 160 may be formed in the valve housing 61 to supply coolant to the oil cooler 48. The coolant is always supplied to the oil cooler 48 for raising the temperature of the oil in a cold condition and cooling the oil in a high temperature condition.

FIG. 4 through FIG. 7 are cross-sectional views showing operations of a coolant control valve according to an exemplary form of the present disclosure. Hereinafter, the operation of the cooling system according to the exemplary form of the present disclosure will be described as shown in FIGS. 4 to 7.

As shown in FIG. 4, when the first outer valve 80 and the first inner valve 90 are positioned at a reference position, the first coolant line 64 and the second coolant line 66 are blocked. Accordingly, coolant flow between the coolant inflow chamber 62 and the first coolant line 64 is blocked by the first outer sealing 150, and coolant flow between the first coolant line 64 and the second coolant line 66 is blocked by the second outer sealing 152. In this case, the first outer hole 84 and the first inner hole 94 are not communicated with each other, and thus coolant flow between the coolant inflow chamber 62 and the second coolant line 66 is cut off.

Figure 5:
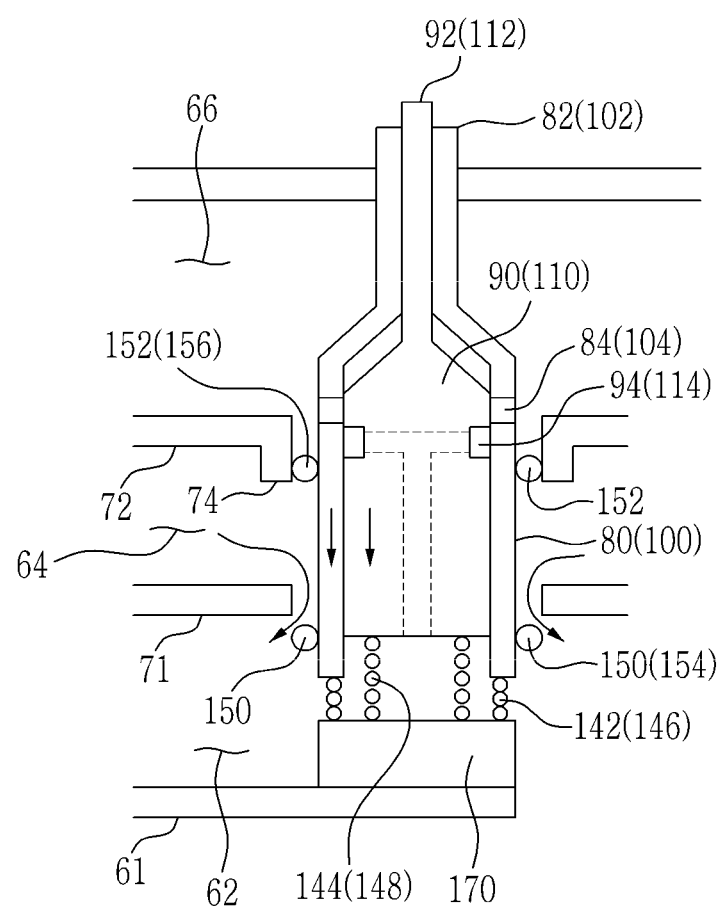

As shown in FIG. 5, when the first outer valve 80 and the first inner valve 90 move downward relative to the reference position shown in FIG. 4, the first outer sealing 150 is separated from the first blocking plate 71 and the coolant inflow chamber 62 and the first coolant line 64 communicate with each other. The coolant flow between the first coolant line 64 and the second coolant line 66 are kept blocked by the second outer sealing 152 and the first outer hole 84 and the first inner hole 94 do not communicate with each other so that the coolant flow between the coolant inflow chamber 62 and the second coolant line 66 is cut off.

Figure 6:
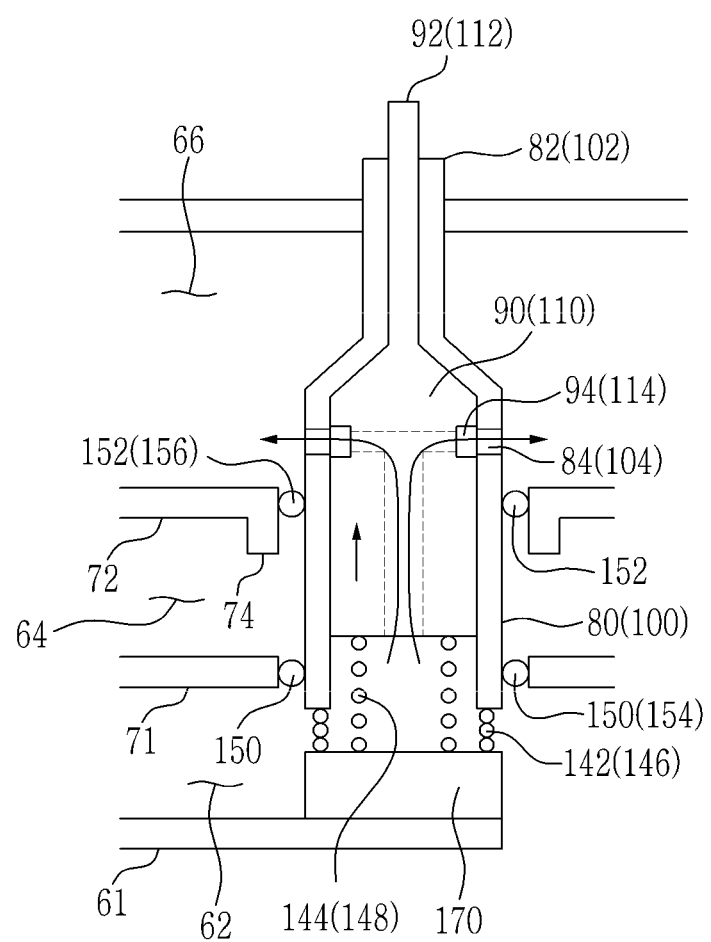

As shown in FIG. 6, when the first inner valve 90 moves upward relative to the reference position shown in FIG. 4, the first outer sealing 150 maintains a state of being in contact with the first blocking plate 71 so that the coolant flow between the coolant inflow chamber 62 and the first coolant line 64 is cut off. The coolant flow between the first coolant line 64 and the second coolant line 66 are kept blocked by the second outer sealing 152 and the first outer hole 84 and the first inner hole 94 communicate with each other so that the coolant may flow between the coolant inflow chamber 62 and the second coolant line 66.

Figure 7:
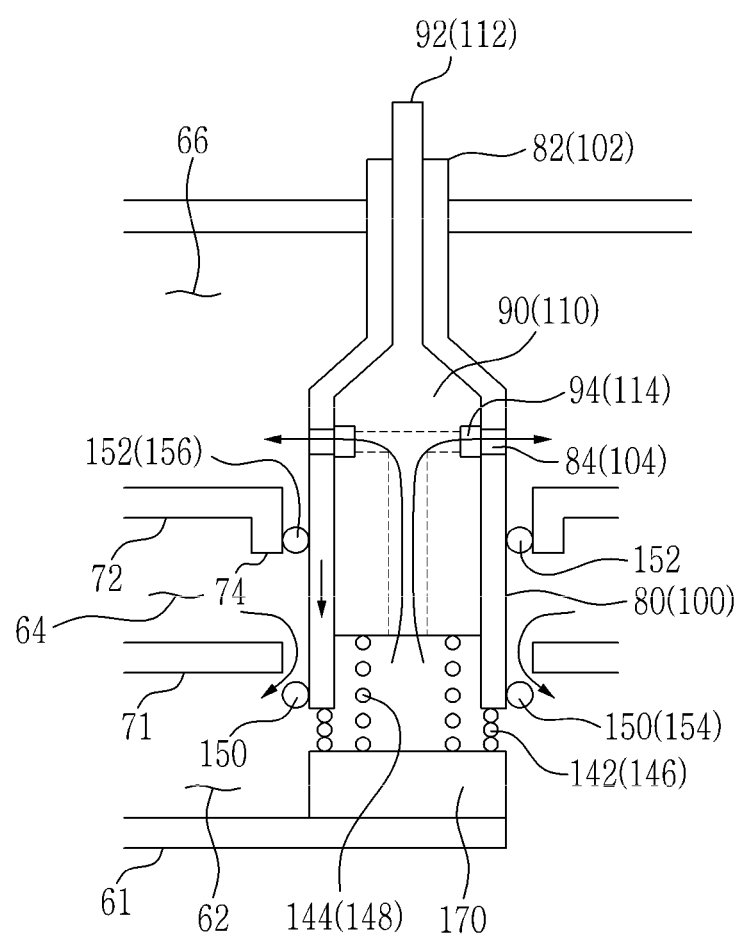

As shown in FIG. 7, when the first outer valve 80 moves downward relative to the reference position shown in FIG. 4, the first outer sealing 150 is separated from the first blocking plate 71 and the coolant inflow chamber 62 and the first coolant line 64 communicate with each other. The coolant flow between the first coolant line 64 and the second coolant line 66 are kept blocked by the second outer sealing 152 and the first outer hole 84 and the first inner hole 94 communicate with each other so that the coolant may flow between the coolant inflow chamber 62 and the second coolant line 66.

Referring to FIG. 2 and FIG. 7, when the first outer valve 80 and the second outer valve 100 move downward relative to the reference position shown in FIG. 4, the coolant inflow chamber 62 and the first coolant line 64 communicate with each other, and the coolant inflow chamber 62 and the third coolant line 68 communicate with each other. In this case, the first outer hole 84 and the first inner hole 94 communicate with each other, and the second outer hole 104 and the second inner hole 114 communicate with each other. Thus, the coolant inflow chamber 62 and the second coolant line 66 communicate with each other, and the coolant inflow chamber 62 and the fourth coolant line 70 communicate each other. Accordingly, the coolant may flow from the coolant inflow chamber 62 to the first coolant line 64, the third coolant line 68 and the fourth coolant line 70.

Figure 8:
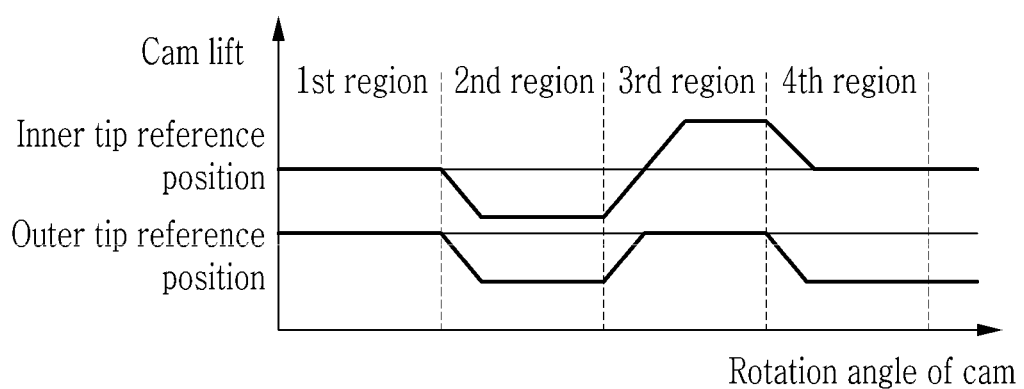
FIG. 8 is a graph showing cam lifts of the coolant control valve according to the exemplary form of the present disclosure.

FIG. 8 is a graph showing cam lifts of a coolant control valve according to an exemplary form of the present disclosure. In the first region, the lift of the first track 122 and the second track 124 are formed such that the first outer valve 80 and the first inner valve 90 are positioned at the reference position, thereby realizing the operation shown in FIG. 4. In the second region, the lift of the first track 122 and the second track 124 are formed such that the first outer valve 80 and the first inner valve 90 move downward, thereby realizing the operation shown in FIG. 5.

In the third region, the lift of the first track 122 and the second track 124 are formed such that the first inner valve 90 moves upward, thereby realizing the operation shown in FIG. 6. In the fourth region, the lift of the first track 122 and the second track 124 are formed such that the first outer valve 80 move downward, thereby realizing the operation shown in FIG. 7. The lifts of the cam shown in FIG. 8 are for illustrating the operation of the coolant control valve according to the form of the present disclosure, and is not limited to the order and the like.

As shown in FIG. 4 through FIG. 8, It is possible to independently control two coolant supply lines by the first outer valve 80 and the first inner valve 90.

The operating principles of the first outer valve 80 and the first inner valve 90 provided on the left side of FIG. 2 and the second outer valve 100 and the second inner valve 110 provided on the right side of FIG. 2 are same. Thus the description of the operation of the second outer valve 100 and the second inner valve 110 will be omitted.

It is possible to independently control four coolant supply lines through the control of the first outer valve 80, the first inner valve 90, the second outer valve 100 and the second inner valve 110.

FIG. 9 through FIG. 12 are schematic diagrams showing operations of a cooling system according to an exemplary form of the present disclosure.

Referring to FIG. 9, the controller 30 determines whether the output signal of the vehicle operation state detecting portion 10 satisfies a predetermined cold driving condition and the controller 30 controls the drive motor 130 such that the first, second, third and fourth coolant lines 64, 66, 68 and 70 are blocked if the cold driving condition is satisfied. For example, the cold driving condition may be set such that the output signal of the second coolant temperature sensor 14 is set at about 50° C. or less, in which case the first, second, third and fourth coolant lines 64, 66, 68 and 70 are blocked, so that the warm-up of the engine 1 may be accelerated.

Figure 10:
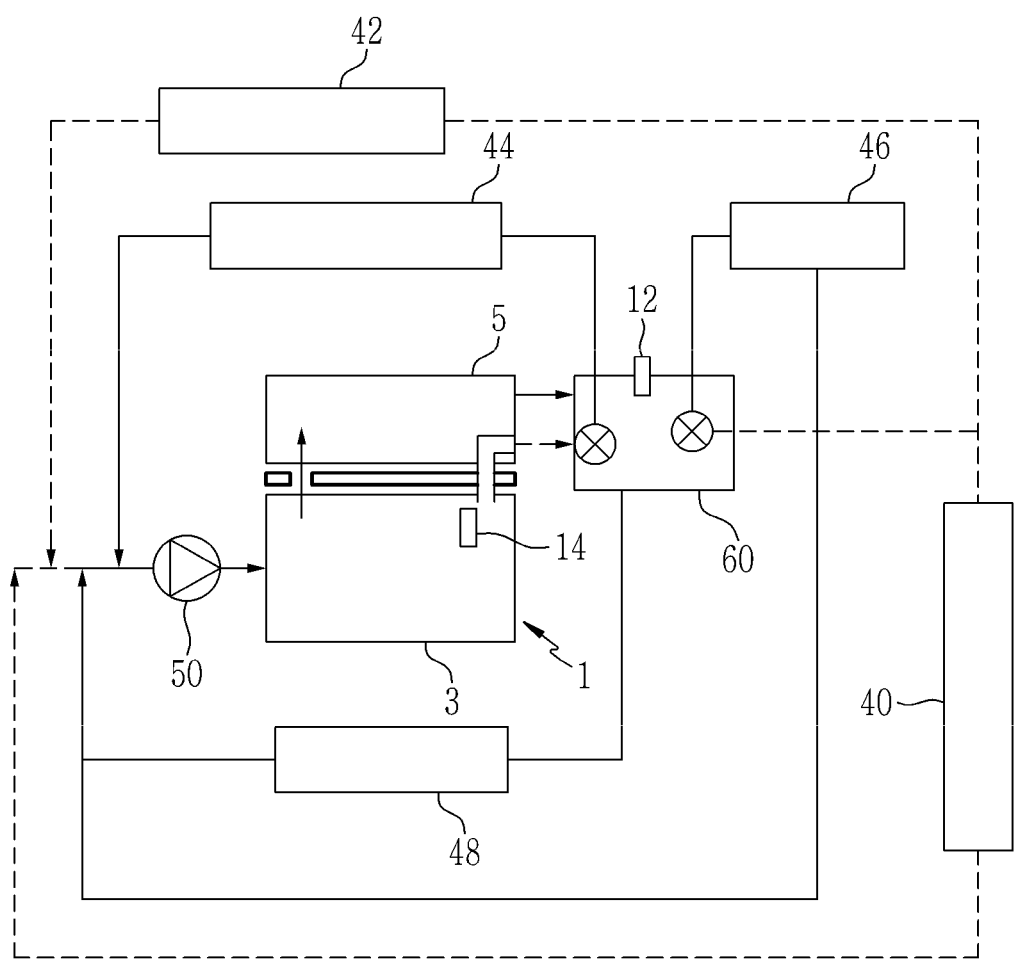

Referring to FIG. 10, the controller 30 determines whether the output signal of the vehicle operation state detecting portion 10 satisfies a predetermined warm driving condition and the controller 30 controls the drive motor 130 such that the second coolant line 66 or the fourth coolant line 70 is opened if the warm driving condition is satisfied. For example, the warm driving condition may be set such that the output signal of the second coolant temperature sensor 14 is set at about 50° C. or more, in which case the coolant is sent to the EGR cooler 44 to recover the exhaust heat and improve the efficiency of the EGR cooler 44. In addition, warming up of the engine 1 proceeds, friction may be reduced and fuel consumption is improved. In addition, when a driver operates the heater switch, the coolant may be supplied to the heater 46 to supply heat to the inside of the vehicle.

Figure 11:
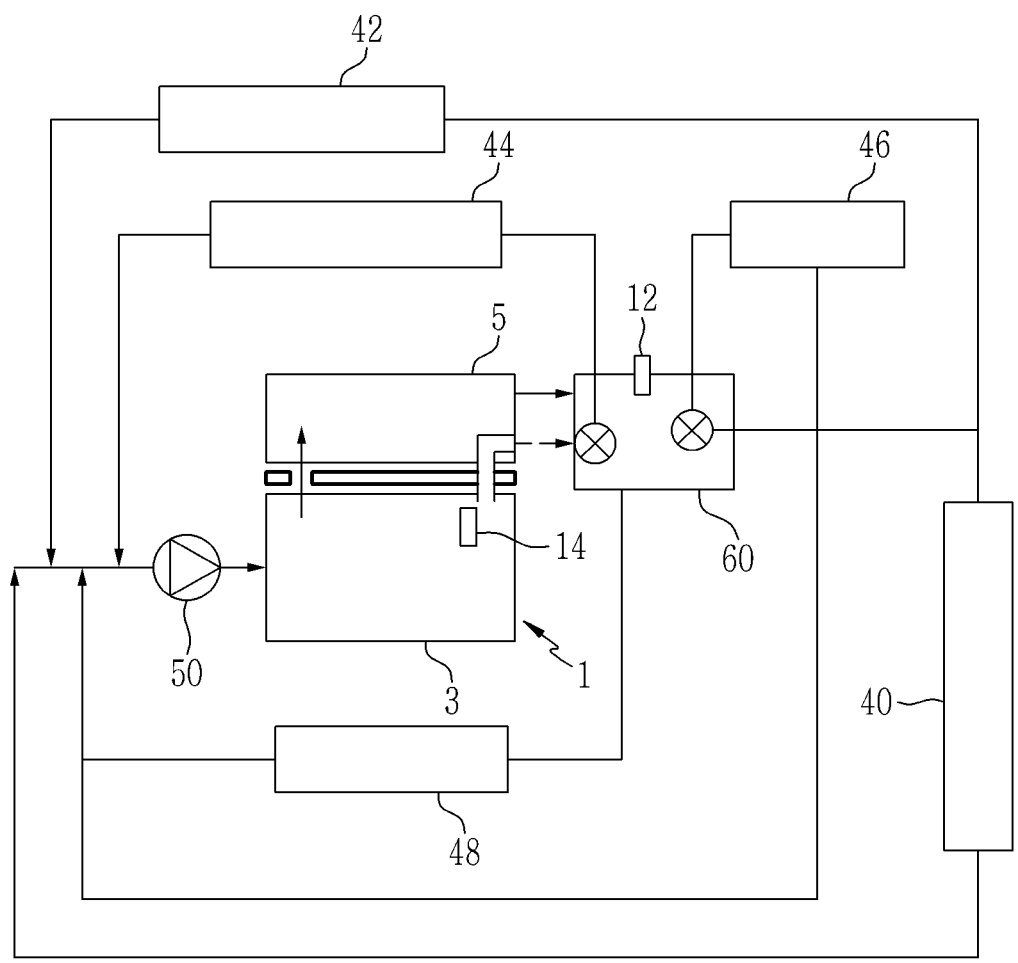

Referring to FIG. 11, the controller 30 determines whether the output signal of the vehicle operation state detecting portion 10 satisfies a predetermined high temperature driving condition and the controller 30 controls the drive motor 130 such that the second coolant line 66, the third coolant line 68 and the fourth coolant line 70 are opened if the high temperature driving condition is satisfied. For example, the high temperature driving condition may be set such that the output signal of the first coolant temperature sensor 12 is set at about 90° C. or more, in which case the coolant is supplied to the radiator 40 to cool the cylinder head 5 and some coolant is circulated to the reservoir tank 42 to perform degassing.

Figure 12:
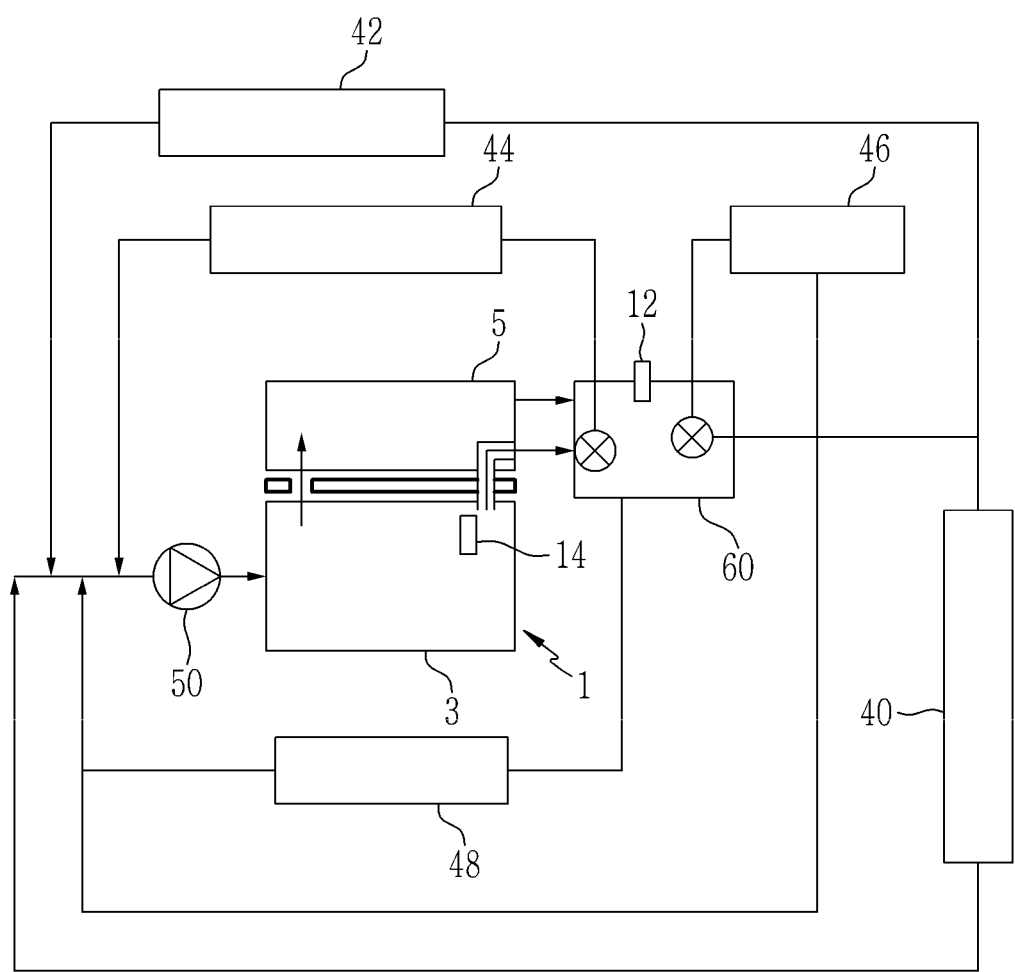

Referring to FIG. 12, the controller 30 determines whether the output signal of the vehicle operation state detecting portion 10 satisfies a predetermined extreme high temperature driving condition and the controller 30 controls the drive motor 130 such that the first, second, third and fourth coolant lines 64, 66, 68 and 70 are opened if the extreme high temperature driving condition is satisfied. For example, the extreme high temperature driving condition may be set such that the output signal of the second coolant temperature sensor 14 is set at about 105° C. or more, in which case the coolant in the engine block 3 is circulated to cool the cylinder head 5 and the engine block 3 and some coolant is circulated to the reservoir tank 42 to perform degassing.

For ease of understanding, the operation of the cooling system according to the form of the present disclosure is described as four operation modes, but the present disclosure is not limited thereto. That is, the cooling system according to the form of the present disclosure may independently control the coolant supplied to the four coolant lines, thereby realizing various cooling modes according to the operating state of the vehicle.

Figure 13:
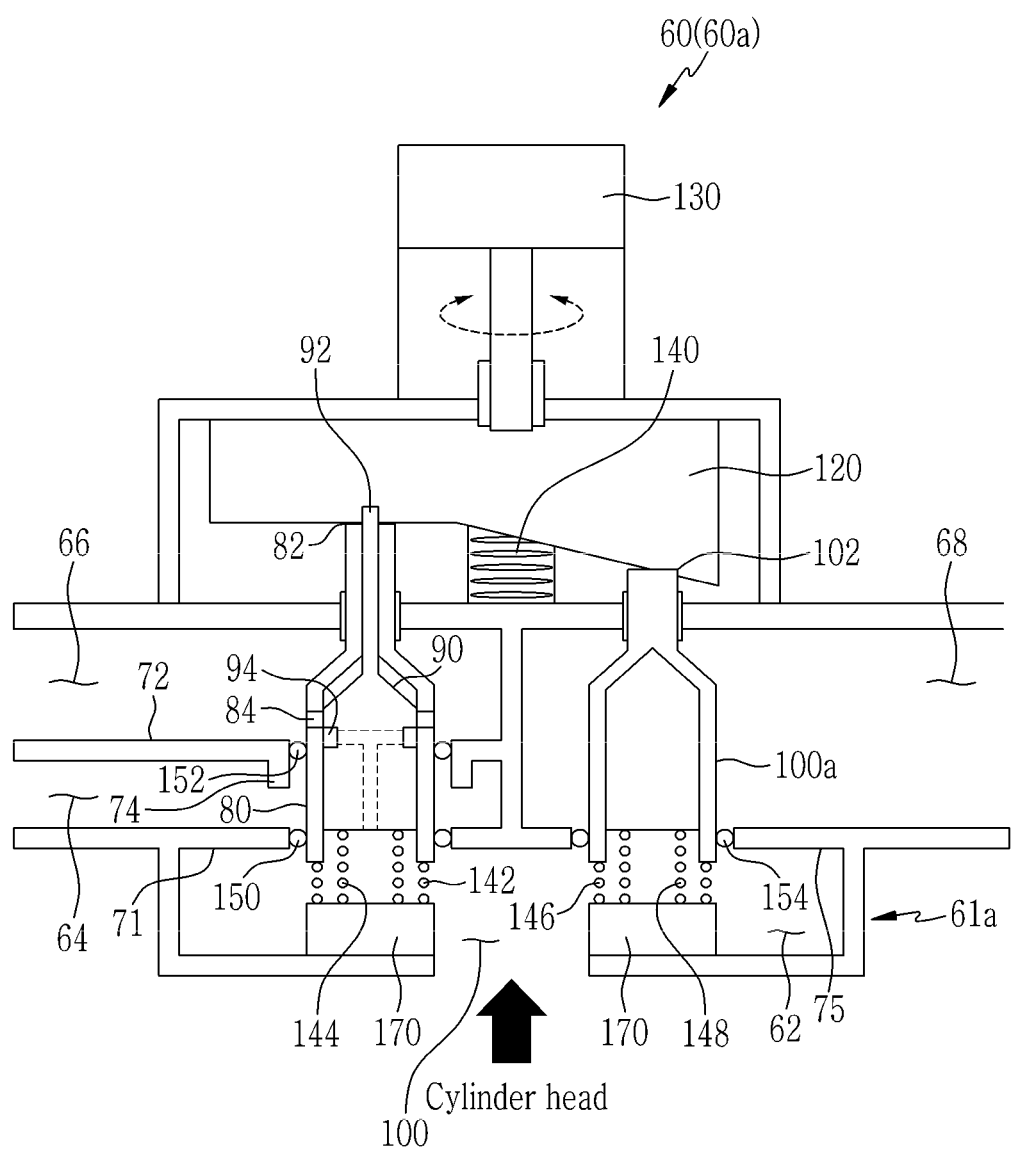
FIG. 13 is a cross-sectional view of a coolant control valve according to a variant exemplary form of the present disclosure.
Figure 14:
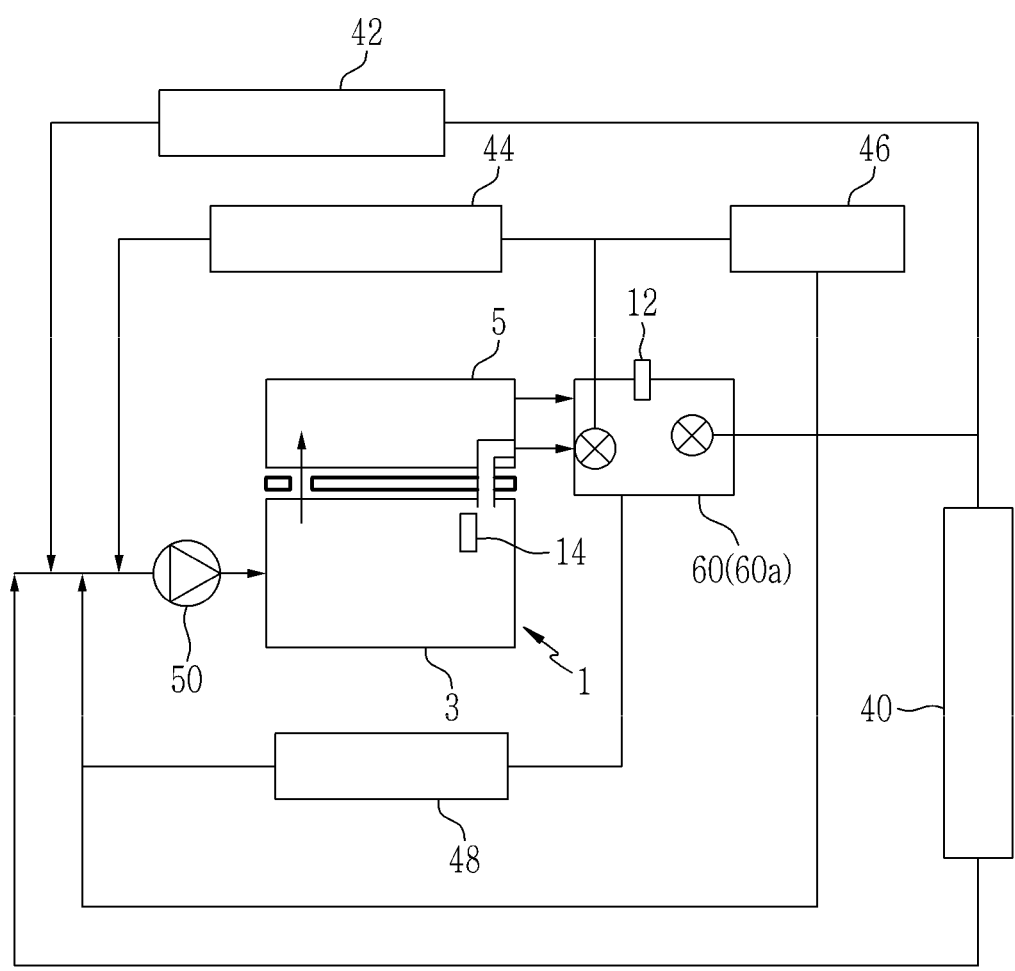
FIG. 14 is a schematic diagram of a cooling system according to the variant exemplary form of the present disclosure.

FIG. 13 is a cross-sectional view of a coolant control valve according to a variant exemplary form of the present disclosure, and FIG. 14 is a schematic diagram of a cooling system according to the variant exemplary form of the present disclosure.

In describing the coolant control valve and the cooling system shown in FIG. 13 and FIG. 14, the same components as those of the coolant control valve and the cooling system of FIG. 1 to FIG. 14, described above will be described using the same reference numerals. In addition, in the description of the coolant control valve and the cooling system shown in FIG. 13 and FIG. 14, a description overlapping with the coolant control valve and the cooling system of FIG. 1 to FIG. 14, described above will be omitted.

A coolant control valve 60a shown in FIGS. 13 and 14 includes a valve housing 61a and in the valve housing 61a, the coolant inflow chamber 62 communicating with the cylinder head 5, the first coolant line 64 communicating with the engine block 3, a second coolant line 66 communicating with at least one of the heat exchanging elements and the third coolant line 68 communicating with the radiator 40.

As shown in FIGS. 13 and 14, the first outer valve 80 and the first inner valve 90 described above are provided and a second outer valve 100a is provided in a valve housing 61a. The second coolant line 66 may supply coolant to the EGR cooler 44 and the heater 46. The supply of the coolant to the first coolant line 64 and the second coolant line 66 may be controlled by the operation of the first outer valve 80 and the first inner valve 90. In addition, the supply of coolant to the third coolant line 68 may be controlled according to the contact/separation between the third outer sealing 154 and the third blocking plate 75.

The coolant control valve 60a and the cooling system may independently supply the coolant to the three coolant lines, and various operating modes may be realized according to the opening and closing of the three coolant lines.

The controller 30 determines whether the output signal of the vehicle operation state detecting portion 10 satisfies the predetermined cold driving condition and the controller 30 controls the drive motor 130 such that the first, second, and third coolant lines 64, 66 and 68 are blocked if the cold driving condition is satisfied.

The controller 30 determines whether the output signal of the vehicle operation state detecting portion 10 satisfies the predetermined warm driving condition and the controller 30 controls the drive motor 130 such that the second coolant line 66 is opened if the warm driving condition is satisfied.

The controller 30 determines whether the output signal of the vehicle operation state detecting portion 10 satisfies the predetermined high temperature driving condition and the controller 30 controls the drive motor 130 such that the second coolant line 66 and the third coolant line 68 are opened if the high temperature driving condition is satisfied.

The controller 30 determines whether the output signal of the vehicle operation state detecting portion 10 satisfies the predetermined extreme high temperature driving condition and the controller 30 controls the drive motor 130 such that the first, second and third coolant lines 64, 66 and 68 are opened if the extreme high temperature driving condition is satisfied.

The cold driving condition, the warm driving condition, the high temperature driving condition and the extreme high temperature driving condition may be preset by experiment under various conditions according to the output signal of the vehicle operation state detecting portion 10, that is, the current state of the vehicle, and can be applied to the control of the controller 30.

The operation of each of the valves and the cam is similar to that of the coolant valve and the cooling system described above, and thus a detailed description thereof will be omitted.

The coolant control valve according to the forms of the present disclosure advantageously reduces the overall volume and layout of the cooling system. The cooling system according to the forms of the present disclosure may control the coolant supplied according to the operating conditions to reduce the warm-up time of the engine. In addition, the cylinder head and the engine block are cooled independently to suppress knocking and improve fuel efficiency.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

1: engine
 3: engine block
 5: cylinder head
 10: vehicle operation state detecting portion
 12: first coolant temperature sensor
 14: second coolant temperature sensor
 16: oil temperature sensor
 18: intake air temperature sensor
 20: accelerator pedal sensor
 22: vehicle speed sensor
 30: controller
 40: radiator
 42: reservoir tank
 44: EGR cooler
 46: heater
 48: oil cooler
 50: water pump 60: coolant control valve
61: valve housing
62: coolant inflow chamber
64: first coolant line
66: second coolant line
68: third coolant line
70: fourth coolant line
71: first blocking plate
72: second blocking plate
74: first guide wall
75: third blocking plate
76: fourth blocking plate
78: second guide wall
80: first outer valve
82: first outer tip
84: first outer hole
90: first inner valve
92: first inner tip
94: first inner hole
100: second outer valve
102: second outer tip
104: second outer hole
110: second inner valve
112: second inner tip
114: second inner hole
120: cam
122: first track
124: second track
126: third track
128: fourth track
130: drive motor
140: cam spring
142: first outer valve spring
144: first inner valve spring
146: second outer valve spring
148: second inner valve spring
150: first outer sealing
152: second outer sealing
154: third outer sealing
156: fourth outer sealing
160: oil cooler line
170: spring plate

What is claimed is:

1. A coolant control valve comprising:
a valve housing including a coolant inflow chamber, a first coolant line, a second coolant line and a third coolant line;
a first outer valve including a first outer tip protruded and a first outer hole configured for communicating with the second coolant line formed thereto, and the first outer valve movably disposed in the valve housing for blocking the second coolant line and for selectively communicating the first coolant line with the coolant inflow chamber;
a first inner valve including a first inner tip protruded and a first inner hole configured for communicating with the coolant inflow chamber and selectively communicating with the first outer hole, and the first inner valve movably disposed in the first outer valve;
a second outer valve including a second outer tip protruded and the second outer valve movably disposed in the valve housing for selectively communicating the third coolant line with the coolant inflow chamber;
a cam including a first track for contacting the first outer tip and selectively pushing the first outer valve, a second track for contacting the first inner tip and selectively pushing the first inner valve and a third track for contacting the second outer tip and selectively for pushing the second outer valve;
a drive motor configured for selectively rotating the cam; and
a controller configured for controlling an operation of the drive motor.

2. The coolant control valve of claim 1, wherein the coolant control valve further comprises a cam spring for elastically supporting the cam.

3. The coolant control valve of claim 1, wherein the coolant control valve further comprises:
a first outer valve spring for elastically supporting the first outer valve,
a first inner valve spring for elastically supporting the first inner valve, and
a second outer valve spring for elastically supporting the second outer valve.

4. The coolant control valve of claim 1, wherein the coolant control valve further comprises:
a first outer sealing attached to the first outer valve for inhibiting leakage of coolant between the first coolant line and the coolant inflow chamber,
a second outer sealing attached to the first outer valve for inhibiting leakage of coolant between the first coolant line and the second coolant line, and
a third outer sealing attached to the second outer valve for inhibiting leakage of coolant between the third coolant line and the coolant inflow chamber.

5. The coolant control valve of claim 4, wherein:
a first blocking plate is disposed between the coolant inflow chamber and the first coolant line;
a second blocking plate is disposed between the first coolant line and the second coolant line;
a first guide wall is formed to an end of the second blocking plate;
the first outer sealing is configured for selectively contacting the first blocking plate; and
the second outer sealing is configured for contacting the first guide wall.

6. The coolant control valve of claim 1, wherein an oil cooler line for supplying coolant to an oil cooler is formed to the valve housing.

7. The coolant control valve of claim 1, wherein the coolant control valve further comprises:
a fourth coolant line formed to the valve housing,
a second outer hole formed to the second outer valve and configured for communicating with the fourth coolant line, and
a second inner valve including a second inner tip protruded and a second inner hole configured for communicating with the coolant inflow chamber and selectively communicating with the second outer hole, and the second inner valve movably disposed in the second outer valve, and
wherein the cam further includes a fourth track for contacting the second inner tip and selectively pushing the second inner valve.

8. The coolant control valve of claim 7, the coolant control valve further comprises:
a first outer valve spring for elastically supporting the first outer valve,
a first inner valve spring for elastically supporting the first inner valve,
a second outer valve spring for elastically supporting the second outer valve, and
a second inner valve spring for elastically supporting the second inner valve.

9. The coolant control valve of claim 7, wherein the coolant control valve further comprising:
   a first outer sealing attached to the first outer valve for inhibiting leakage of coolant between the first coolant line and the coolant inflow chamber,
   a second outer sealing attached to the first outer valve for inhibiting leakage of coolant between the first coolant line and the second coolant line,
   a third outer sealing attached to the second outer valve for inhibiting leakage of coolant between the third coolant line and the coolant inflow chamber, and
   a fourth outer sealing attached to the second outer valve for inhibiting leakage of coolant between the fourth coolant line and the third coolant line.

10. The coolant control valve of claim 9, wherein:
    a first blocking plate is disposed between the coolant inflow chamber and the first coolant line;
    a second blocking plate is disposed between the first coolant line and the second coolant line;
    a first guide wall is formed to an end of the second blocking plate;
    the first outer sealing is configured for selectively contacting the first blocking plate;
    the second outer sealing is configured for contacting the first guide wall;
    a third blocking plate is disposed between the coolant inflow chamber and the third coolant line;
    a fourth blocking plate is disposed between the third coolant line and the fourth coolant line;
    a second guide wall is formed to an end of the fourth blocking plate;
    the third outer sealing is configured for selectively contacting the third blocking plate; and
    the fourth outer sealing is configured for contacting the second guide wall.

11. A cooling system comprising:
    a water pump;
    an engine receiving coolant from the water pump and including an engine block and a cylinder head;
    a valve housing including a coolant inflow chamber for communicating with the cylinder head, a first coolant line for communicating with the engine block, a second coolant line for communicating with at least one of heat exchange elements and a third coolant line for communicating with a radiator;
    a first outer valve including a first outer tip protruded and a first outer hole configured for communicating with the second coolant line, and the first outer valve movably disposed in the valve housing for blocking the second coolant line and for selectively communicating the first coolant line with the coolant inflow chamber;
    a first inner valve including a first inner tip protruded and a first inner hole configured for communicating with the coolant inflow chamber and selectively communicating with the first outer hole, and the first inner valve movably disposed in the first outer valve;
    a second outer valve including a second outer tip protruded and the second outer valve movably disposed in the valve housing for selectively communicating the third coolant line with the coolant inflow chamber;
    a cam including a first track for contacting the first outer tip and selectively pushing the first outer valve, a second track for contacting the first inner tip and selectively pushing the first inner valve and a third track for contacting the second outer tip and selectively pushing the second outer valve;
    a drive motor configured for selectively rotating the cam;
    a first coolant temperature sensor configured for measuring a first temperature of coolant passing through the cylinder head and outputting a first corresponding signal;
    a second coolant temperature sensor configured for measuring a second temperature of coolant passing through the engine block and outputting a second corresponding signal; and
    a controller configured for controlling operation of the drive motor according to output signals of a vehicle operation state detecting portion including the first and the second coolant temperature sensors.

12. The cooling system of claim 11, wherein the cooling system further comprises:
    a first outer sealing attached to the first outer valve for inhibiting leakage of coolant between the first coolant line and the coolant inflow chamber,
    a second outer sealing attached to the first outer valve for inhibiting leakage of coolant between the first coolant line and the second coolant line, and
    a third outer sealing attached to the second outer valve for inhibiting leakage of coolant between the third coolant line and the coolant inflow chamber.

13. The cooling system of claim 12, wherein:
    a first blocking plate is disposed between the coolant inflow chamber and the first coolant line;
    a second blocking plate is disposed between the first coolant line and the second coolant line;
    a first guide wall is formed to an end of the second blocking plate;
    the first outer sealing is configured for selectively contacting the first blocking plate; and
    the second outer sealing is configured for contacting the first guide wall.

14. The cooling system of claim 11, wherein the cooling system further comprises:
    a fourth coolant line formed to the valve housing,
    a second outer hole formed to the second outer valve and configured for communicating with the fourth coolant line, and
    a second inner valve including a second inner tip protruded and a second inner hole configured for communicating with the coolant inflow chamber and selectively communicating with the second outer hole, and the second inner valve movably disposed in the second outer valve, and
    wherein the cam further includes a fourth track for contacting the second inner tip and selectively pushing the second inner valve.

15. The cooling system of claim 14, wherein the cooling system further comprises:
    a first outer sealing attached to the first outer valve for inhibiting leakage of coolant between the first coolant line and the coolant inflow chamber,
    a second outer sealing attached to the first outer valve for inhibiting leakage of coolant between the first coolant line and the second coolant line;
    a third outer sealing attached to the second outer valve for inhibiting leakage of coolant between the third coolant line and the coolant inflow chamber; and
    a fourth outer sealing attached to the second outer valve for inhibiting leakage of coolant between the fourth coolant line and the third coolant line.

16. The cooling system of claim 15, wherein:
    a first blocking plate is disposed between the coolant inflow chamber and the first coolant line;

a second blocking plate is disposed between the first coolant line and the second coolant line;

a first guide wall is formed to an end of the second blocking plate;

the first outer sealing is configured for selectively contacting the first blocking plate;

the second outer sealing is configured for contacting the first guide wall;

a third blocking plate is disposed between the coolant inflow chamber and the third coolant line;

a fourth blocking plate is disposed between the third coolant line and the fourth coolant line;

a second guide wall is formed to an end of the fourth blocking plate;

the third outer sealing is configured for selectively contacting the third blocking plate; and the fourth outer sealing is configured for contacting the second guide wall.

17. A control method of the cooling system of claim 14, wherein:

the controller determines whether the output signal of the vehicle operation state detecting portion satisfies a predetermined cold driving condition and the controller controls the drive motor such that the first, second, third, and fourth coolant lines are blocked if the cold driving condition is satisfied;

the controller determines whether the output signal of the vehicle operation state detecting portion satisfies a predetermined warm driving condition and the controller controls the drive motor such that the second coolant line or the fourth coolant line is opened if the warm driving condition is satisfied;

the controller determines whether the output signal of the vehicle operation state detecting portion satisfies a predetermined high temperature driving condition and the controller controls the drive motor such that the second, third and fourth coolant lines are opened if the high temperature driving condition is satisfied; and the controller determines whether the output signal of the vehicle operation state detecting portion satisfies a predetermined extreme high temperature driving condition and the controller controls the drive motor such that the first, second, third and fourth coolant lines are opened if the extreme high temperature driving condition is satisfied.

18. The cooling system of claim 11, wherein an oil cooler line for supplying coolant to an oil cooler is formed to the valve housing.

19. A control method of the cooling system of claim 11, wherein the controller determines whether the output signal of the vehicle operation state detecting portion satisfies a predetermined cold driving condition and the controller controls the drive motor such that the first, second, and third coolant lines are blocked if the cold driving condition is satisfied.

20. The control method of claim 19, wherein the controller determines whether the output signal of the vehicle operation state detecting portion satisfies a predetermined warm driving condition and the controller controls the drive motor such that the second coolant line is opened if the warm driving condition is satisfied.

21. The control method of claim 19, wherein the controller determines whether the output signal of the vehicle operation state detecting portion satisfies a predetermined high temperature driving condition and the controller controls the drive motor such that the second and third coolant lines are opened if the high temperature driving condition is satisfied.

22. The control method of claim 19, wherein the controller determines whether the output signal of the vehicle operation state detecting portion satisfies a predetermined extreme high temperature driving condition and the controller controls the drive motor such that the first, second and third coolant lines are opened if the extreme high temperature driving condition is satisfied.

* * * * *